United States Patent
Wallman et al.

(10) Patent No.: US 6,912,708 B2
(45) Date of Patent: Jun. 28, 2005

(54) METHOD AND APPARATUS TO FACILITATE DEBUGGING A PLATFORM-INDEPENDENT VIRTUAL MACHINE

(75) Inventors: David Wallman, Sunnyvale, CA (US); Stepan Sokolov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 673 days.

(21) Appl. No.: 09/895,903

(22) Filed: Jun. 28, 2001

(65) Prior Publication Data

US 2003/0028861 A1 Feb. 6, 2003

(51) Int. Cl.[7] ............................ G06F 9/44; G06F 11/00
(52) U.S. Cl. ........................ 717/128; 717/126; 714/49
(58) Field of Search ................................. 717/124–135

(56) References Cited

U.S. PATENT DOCUMENTS

| | | | | |
|---|---|---|---|---|
| 5,901,315 A | | 5/1999 | Edwards et al. ............ | 395/704 |
| 6,637,024 B1 | * | 10/2003 | Johnson et al. ............. | 717/124 |
| 6,795,962 B1 | * | 9/2004 | Hanson ....................... | 717/129 |
| 2002/0129337 A1 | * | 9/2002 | Evans et al. ................ | 717/124 |

FOREIGN PATENT DOCUMENTS

| JP | 2001184230 A | * | 7/2001 | ........... | G06F/11/28 |
|---|---|---|---|---|---|
| WO | WO 00/41078 | | 7/2000 | | |

OTHER PUBLICATIONS

Riggs et al., Pickling State in the Java(tm) System, Jun. 1996, Proceedings of the USENIX 1996.*

Research Disclosure entitled "Remote Debugging and Viewing the Real–Time Status of Perl Scripts", Dec. 2000, XP–001052449, p. 2111.

* cited by examiner

*Primary Examiner*—Anil Khatri
*Assistant Examiner*—Trent J Roche
(74) *Attorney, Agent, or Firm*—Park, Vaughan & Fleming LLP

(57) ABSTRACT

One embodiment of the present invention provides a system that facilitates debugging a platform-independent virtual machine. The system operates by providing an agent on the platform-independent virtual machine, which provides a set of functions for accessing variables in the platform-independent virtual machine. The platform-independent virtual machine is adapted to call the set of functions within the agent. Next, the agent examines the current state of the variables in the platform-independent virtual machine. The agent communicates the current state of the variables to a host machine. An operator of the host machine can then analyze the current state of the variables.

21 Claims, 2 Drawing Sheets

METHOD AND APPARATUS TO FACILITATE DEBUGGING A PLATFORM-INDEPENDENT VIRTUAL MACHINE

BACKGROUND

1. Field of the Invention

The present invention relates to computing systems. More specifically, the present relates to a method and an apparatus for debugging a platform-independent virtual machine within a computer system.

2. Related Art

Computer programs written in languages such as the JAVA™ programming language are compiled into a platform-independent code, which is executed on a platform-independent virtual machine, such as a JAVA VIRTUAL MACHINE™ (JVM). A program that has been compiled into a platform-independent code has the advantage that it can execute on a platform-independent virtual machine regardless of the underlying central processing unit and native code. The terms JAVA, JVM and JAVA VIRTUAL MACHINE are trademarks of SUN Microsystems, Inc. of Palo Alto, Calif.

A platform-independent virtual machine is typically customized to fit in the memory of the computing device without adversely affecting the memory available for applications. For example, a platform-independent virtual machine on a small device such as a personal digital assistant (PDA) has few if any optional features while a platform-independent virtual machine on a desktop computer or mainframe computer may have many options and include a just-in-time (JIT) compiler.

Customizing the platform-independent virtual machine for a different computing device is commonly termed "porting" the platform-independent virtual machine. Porting the platform-independent virtual machine to a different computing device can be difficult, particularly for a small device such as a PDA, because there are few, if any, debugging programs and devices available to aid in the porting process.

Because of the lack of debugging facilities, an analyst typically inserts print statements into the code for the virtual machine at various places to try to determine the state of variables within the platform-independent virtual machine. This is a trial-and-error process, in which the analyst examines a few variables and then decides which other variables to examine. Each iteration involves changing the source code for the platform-independent virtual machine, recompiling the code, downloading the executable code to the target machine, and running the new executable code. This is a time-consuming process and detracts from the analyst's concentration in locating the problem. Additionally, inserting print statements into the code can affect the operation of the code in such a way that the problem is masked.

What is needed is a method and an apparatus that allows an analyst to view the state of variables within a platform-independent virtual machine without the problems listed above.

SUMMARY

One embodiment of the present invention provides a system that facilitates debugging a platform-independent virtual machine. The system operates by providing an agent on the platform-independent virtual machine, which provides a set of functions for accessing variables in the platform-independent virtual machine. The platform-independent virtual machine is then adapted to call the set of functions within the agent. Next, the agent examines the current state of the variables in the platform-independent virtual machine. The agent communicates the current state of the variables to a host machine. An operator of the host machine can then analyze the current state of the variables.

In one embodiment of the present invention, the agent includes a core portion that is common across multiple platforms and a platform-specific portion for each platform.

In one embodiment of the present invention, the platform-specific portion includes features and structures related to a specific platform-independent virtual machine.

In one embodiment of the present invention, adapting the platform-independent virtual machine to call the set of functions within the agent involves inserting checkpoints within executable code for the platform-independent virtual machine.

In one embodiment of the present invention, a checkpoint uses the set of functions to examine the current state of variables of the platform-independent virtual machine and communicate the current state of the variables to the host machine In one embodiment of the present invention, communicating the current state of the variables to the host machine involves using either a direct coupling or a network coupling.

In one embodiment of the present invention, the agent includes only mechanisms for collecting data, thereby limiting memory use of the agent on the platform-independent virtual machine.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Devices

Figure 1:
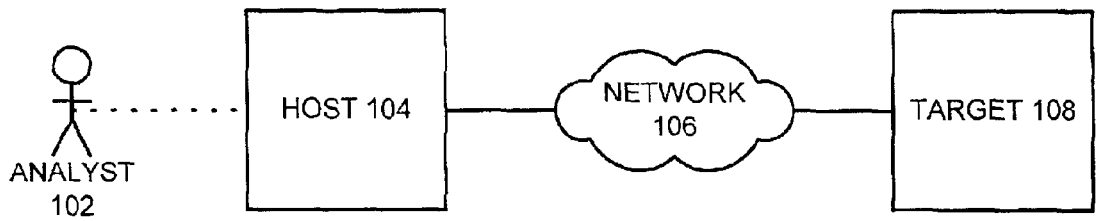
FIG. 1 illustrates computing devices coupled together in accordance with an embodiment of the present invention.

FIG. 1 illustrates computing devices coupled together in accordance with an embodiment of the present invention. The system includes host 104 and target 108. Host 104 and target 108 can generally include any type of computer system, including, but not limited to, a computer system based on a microprocessor, a mainframe computer, a digital signal processor, a portable computing device, a personal organizer, a device controller, and a computational engine within an appliance.

Host 104 and target 108 are coupled together by network 106. Network 106 can generally include any type of wire or wireless communication channel capable of coupling together computing nodes. This includes, but is not limited to, a local area network, a wide area network, or a combination of networks. In one embodiment of the present invention, network 106 includes a direct coupling.

Analyst 102 uses host 104 to install and debug a platform-independent virtual machine on target 108. Target 108 can include computing devices, which have a wide range of resources and requirements. For example, target 108 can be a personal digital assistant (PDA) with limited memory and few if any optional features. Target 108 can also be a desktop computer or mainframe computer and may have large quantities of available memory and many options, such as a just-in-time (JIT) compiler.

Host 104 communicates with target 108 across network 106 to capture and display variables and data within target 108 as described below. Host 104 is typically a computing device such as a desktop computer with sufficient resources to store the variables from target 108 and to display these variables to analyst 102.

Target 108

Figure 2:
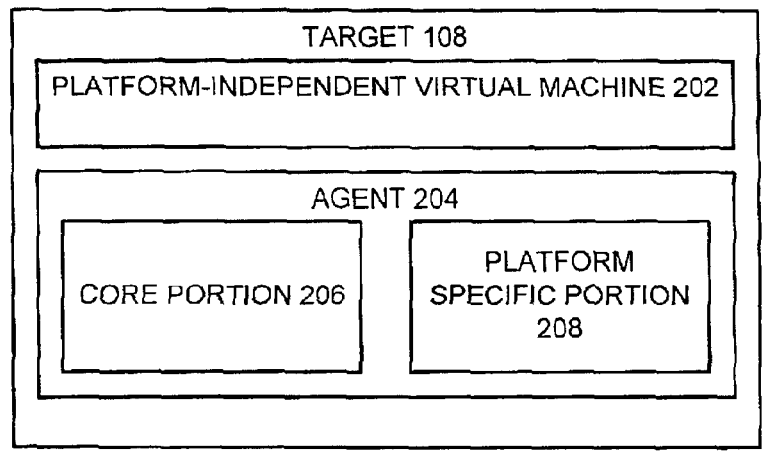
FIG. 2 illustrates target machine 108 in accordance with an embodiment of the present invention.

FIG. 2 illustrates target 108 in accordance with an embodiment of the present invention. Target 108 includes platform-independent virtual machine 202 and agent 204. Platform-independent virtual machine 202 is a computer program in the native code of target 108, which can execute platform-independent code such as JAVA bytecode.

Agent 204 is used to debug platform-independent virtual machine 202 and includes core portion 206 and platform specific portion 208. In one embodiment of the present invention, agent 204 is limited to gathering the current state of variables within platform-independent virtual machine 202 and communicating the state of those variables to host 104 for display to analyst 102. Limiting agent 204 in this way reduces the memory requirements for agent 204 and thereby allows agent 204 to be included with platform-independent virtual machine 202 even when target 108 has limited resources. Note that this embodiment of agent 204 does not include all of the usual functions of a debugger, such as breakpoints, setting new values for variables, single stepping through the code, and the like.

Core portion 206 includes data structures and procedures, which are common across multiple targets. These data structures include procedures for gathering the state of variables within platform-independent virtual machine 202 and communicating the state of these variables to host 104. Platform specific portion 208 includes data structures and procedures, which are customized for the options and unique details of platform-independent virtual machine 202 on target 108. Separating the agent into core portion 206 and platform specific portion 208 is advantageous because core portion 206 remains invariant across multiple platforms. During porting, therefore, only platform specific portion 208 needs to be changed.

Analyst 102 includes checkpoints within platform-independent virtual machine 202, which call functions within agent 204 to gather the current state of variables within platform-independent virtual machine 202 and to communicate the current state of these variables to host 104. A checkpoint identifies the variables of interest at that checkpoint.

Following is an example of a function within platform-independent virtual machine 202, which has checkpoints included:

```
foo (formal parameters):var1, var2
{
    :
    :
    checkpoint( );
    :
    :
    checkpoint( );
    :
}
```

In this example, function foo is a function within platform-independent virtual machine 202, which has been adapted to gather the current state of variables to be presented to analyst 102. The variables of interest in this case are var1 and var2. Upon reaching the checkpoint instructions, the current state of these variables will be passed to host 104 for display. A pre-compiler makes the necessary adjustments to the code so that the code can be compiled by a compiler.

Optionally, the following code can be used:

```
foo (formal parameters)
{
    :
    :
    checkpoint(var1, var2);
    :
    :
    checkpoint(var1, var2);
    :
}
```

In this example, the variables of interest are listed as actual parameters of the checkpoint instructions.

Host 104

Figure 3:
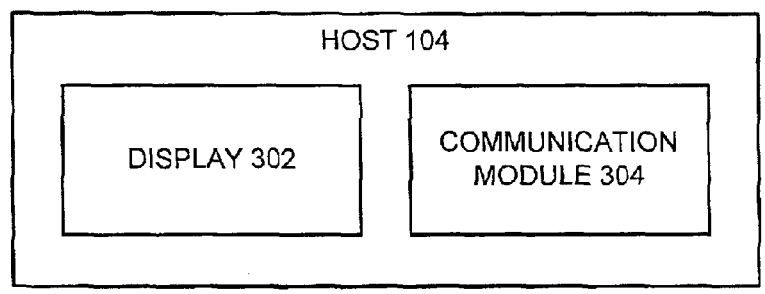
FIG. 3 illustrates host machine 104 in accordance with an embodiment of the present invention.

FIG. 3 illustrates host 104 in accordance with an embodiment of the present invention. Host 104 includes display 302 and communication module 304. Communication module 304 communicates with agent 204 on target 108 across network 106 to receive the state of variables within platform-independent virtual machine 202.

Display 302 presents these variable to analyst 102 so that analyst 102 can determine if platform-independent virtual machine 202 is operating correctly, and, if not, to aid analyst 102 in determining a possible cause of the incorrect operation.

Analyzing Data

Figure 4:
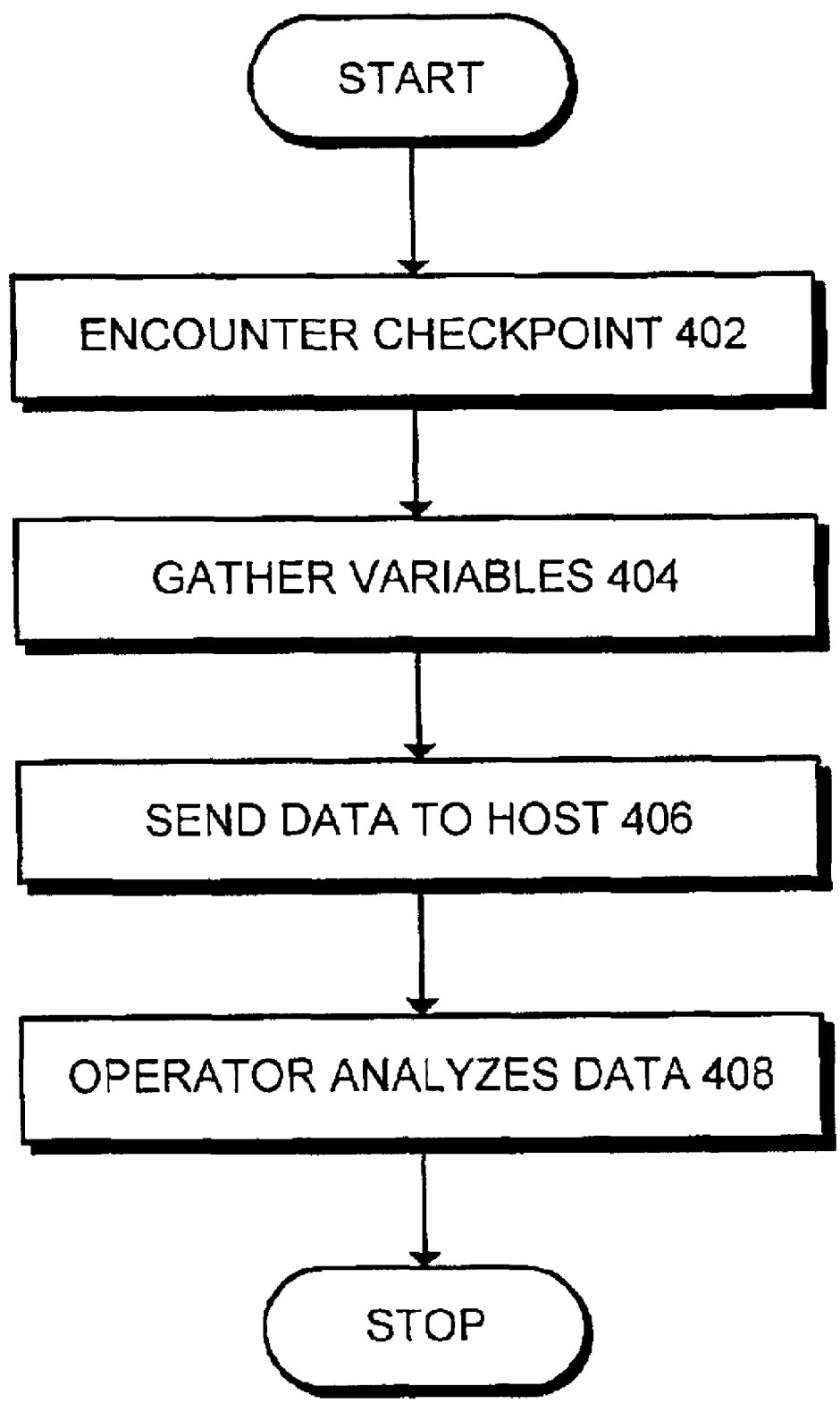
FIG. 4 is a flowchart illustrating the process of gathering and using data from a target machine in accordance with an embodiment of the present invention.

FIG. 4 is a flowchart illustrating the process of gathering and using data in accordance with an embodiment of the present invention. The system starts when platform-independent virtual machine 202 encounters a checkpoint within the code (step 402). Upon encountering the checkpoint, platform-independent virtual machine 202 uses routines within agent 204 to gather the current state of variables of interest at that checkpoint (step 404).

Next, platform-independent virtual machine 202 uses routines within agent 204 to communicate the current state of these variables to host 104 (step 406). Finally, analyst 102 analyzes the current state of the variables using display 302 (step 408).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate debugging a platform-independent virtual machine, comprising:

providing an agent on the platform-independent virtual machine, wherein the agent provides a set of functions for accessing a plurality of variables in the platform-independent virtual machine and wherein the agent is limited to gathering a current state of variables within the platform-independent virtual machine, whereby limiting the agent to gathering the current state of variables within the platform-independent virtual machine allows the method to operate on a system with limited memory;

adapting the platform-independent virtual machine to call the set of functions within the agent;

examining a current state of the plurality of variables in the platform-independent virtual machine using the agent; and communicating the current state of the plurality of variables to a host machine, wherein an operator of the host machine can analyze the current state of the plurality of variables to determine if the platform-independent virtual machine is operating correctly and, if not, to determine a possible cause of incorrect operation.

2. The method of claim 1, wherein the agent includes a core portion that is common across multiple platforms and a platform-specific portion for each platform.

3. The method of claim 2, wherein the platform-specific portion includes features and structures related to a specific platform-independent virtual machine.

4. The method of claim 1, wherein adapting the platform-independent virtual machine to call the set of functions within the agent involves inserting checkpoints within executable code for the platform-independent virtual machine.

5. The method of claim 4, wherein a checkpoint uses the set of functions to examine the current state of the plurality of variables and communicate the current state of the plurality of variables to the host machine.

6. The method of claim 1, wherein communicating the current state of the plurality of variables to the host machine involves using one of a direct coupling and a network coupling.

7. The method of claim 1, wherein the agent only includes resources for collecting data, thereby limiting memory usage of the agent.

8. A computer-readable storage medium storing instructions that when executed by a computer cause the computer to perform a method to facilitate debugging of a platform-independent virtual machine, the method comprising:

providing an agent on the platform-independent virtual machine, wherein the agent provides a set of functions for accessing a plurality of variables in the platform-independent virtual machine and wherein the agent is limited to gathering a current state of variables within the platform-independent virtual machine, whereby limiting the agent to gathering the current state of variables within the platform-independent virtual machine allows the method to operate on a system with limited memory;

adapting the platform-independent virtual machine to call the set of functions within the agent;

examining a current state of the plurality of variables in the platform-independent virtual machine using the agent; and communicating the current state of the plurality of variables to a host machine, wherein an operator of the host machine can analyze the current state of the plurality of variables to determine if the platform-independent virtual machine is operating correctly and, if not, to determine a possible cause of incorrect operation.

9. The computer-readable storage medium of claim 8, wherein the agent includes a core portion that is common across multiple platforms and a platform-specific portion for each platform.

10. The computer-readable storage medium of claim 9, wherein the platform-specific portion includes features and structures related to a specific platform-independent virtual machine.

11. The computer-readable storage medium of claim 8, wherein adapting the platform-independent virtual machine to call the set of functions within the agent involves inserting checkpoints within executable code for the platform-independent virtual machine.

12. The computer-readable storage medium of claim 11, wherein a checkpoint uses the set of functions to examine the current state of the plurality of variables and communicate the current state of the plurality of variables to the host machine.

13. The computer-readable storage medium of claim 8, wherein communicating the current state of the plurality of variables to the host machine involves using one of a direct coupling and a network coupling.

14. The computer-readable storage medium of claim 8, wherein the agent only includes resources for collecting data, thereby limiting memory usage of the agent.

15. An apparatus that facilitates debugging of a platform-independent virtual machine, comprising:

a providing mechanism that is configured to provide an agent on the platform-independent virtual machine, wherein the agent provides a set of functions for accessing a plurality of variables in the platform-independent virtual machine and wherein the agent is limited to gathering a current state of variables within the platform-independent virtual machine, whereby limiting the agent to gathering the current state of variables within the platform-independent virtual machine allows the mechanism to operate on a system with limited memory;

an adapting mechanism that is configured to adapt the platform-independent virtual machine to call the set of functions within the agent;

an examining mechanism that is configured to examine a current state of the plurality of variables in the platform-independent virtual machine using the agent; and a communicating mechanism that is configured to communicate the current state of the plurality of variables to a host machine, wherein an operator of the host machine can analyze the current state of the plurality of variables to determine if the platform-independent virtual machine is operating correctly and, if not, to determine a possible cause of incorrect operation.

16. The apparatus of claim 15, wherein the agent includes a core portion that is common across multiple platforms and a platform-specific portion for each platform.

17. The apparatus of claim 16, wherein the platform-specific portion includes features and structures related to a specific platform-independent virtual machine.

18. The apparatus of claim 15, further comprising an inserting mechanism that is configured to insert checkpoints within executable code for the platform-independent virtual machine.

19. The apparatus of claim 18, wherein a checkpoint uses the set of functions to examine the current state of the plurality of variables and communicate the current state of the plurality of variables to the host machine.

20. The apparatus of claim 15, wherein communicating the current state of the plurality of variables to the host machine involves using one of a direct coupling and a network coupling.

21. The apparatus of claim 15, wherein the agent only includes resources for collecting data, thereby limiting memory usage of the agent.

* * * * *